United States Patent

Bourke et al.

[11] 3,894,765
[45] July 15, 1975

[54] TENT SHELTER FOR AUTOMOTIVE VEHICLES AND THE LIKE

[76] Inventors: Robert E. Bourke, 145 Goodhill Rd., Weston; Robert W. Johnson, 29 Danbury Ave., Westport, both of Conn. 06880

[22] Filed: Sept. 13, 1973

[21] Appl. No.: 396,725

[52] U.S. Cl.............. 296/23 R; 135/1 A; 135/4 A
[51] Int. Cl.............................................. B60p 3/32
[58] Field of Search.......... 296/23 R, 23 MC, 23 A, 296/23 B; 135/1 A, 4 A, 5 A; 224/42.1 R, 42.1 E, 42.1 H, 42.1 F, 29 R; 214/450

[56] References Cited
UNITED STATES PATENTS

| | | | |
|---|---|---|---|
| 1,568,895 | 1/1926 | Lyons | 296/23 R |
| 1,679,886 | 8/1928 | Wright | 135/1 A |
| 2,089,516 | 8/1937 | West et al. | 198/9 X |
| 2,434,387 | 1/1948 | Brandt | 224/42.1 F |
| 2,696,375 | 12/1954 | Huff | 198/9 |
| 2,806,478 | 9/1957 | Sherbinin | 135/5 A |
| 2,862,598 | 12/1958 | Oswalt | 198/9 |
| 3,061,047 | 10/1962 | Gunning | 187/9 X |
| 3,202,159 | 8/1965 | Reed | 135/4 A |
| 3,211,308 | 10/1965 | Glass | 214/518 |
| 3,259,422 | 7/1966 | Canon | 296/23 MC |
| 3,263,846 | 8/1966 | Balbi | 214/518 |
| 3,438,670 | 4/1969 | Salmans | 135/1 A |
| 3,582,130 | 6/1971 | Borskey | 296/23 R |
| 3,613,344 | 10/1971 | Weichel | 56/364 |
| 3,687,322 | 8/1972 | Stieren | 214/520 |
| 3,724,893 | 9/1971 | Giroux | 296/23 R |
| 3,746,386 | 7/1973 | Woodward | 296/23 MC |

*Primary Examiner*—Albert J. Makay
*Assistant Examiner*—Donald W. Underwood
*Attorney, Agent, or Firm*—Mason, Fenwick & Lawrence

[57] ABSTRACT

A tent shelter to be used in combination with an automotive vehicle for camping or work comprising a self-contained tent shelter unit which is stowed on the roof of the vehicle and is pivotable from the stowed position to a rearwardly and upwardly displaced position to form a walled enclosure at the rear or side of the vehicle.

6 Claims, 6 Drawing Figures

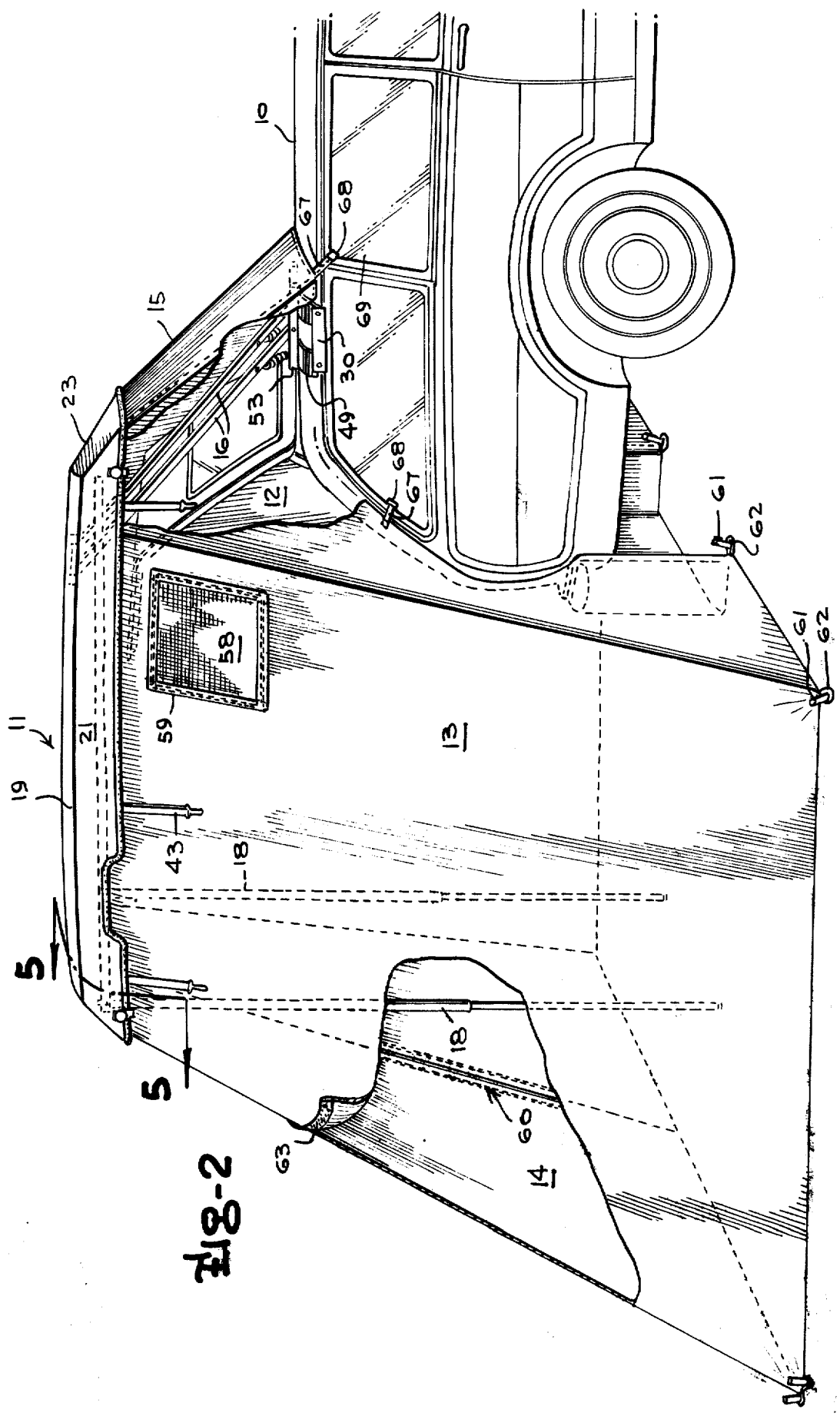

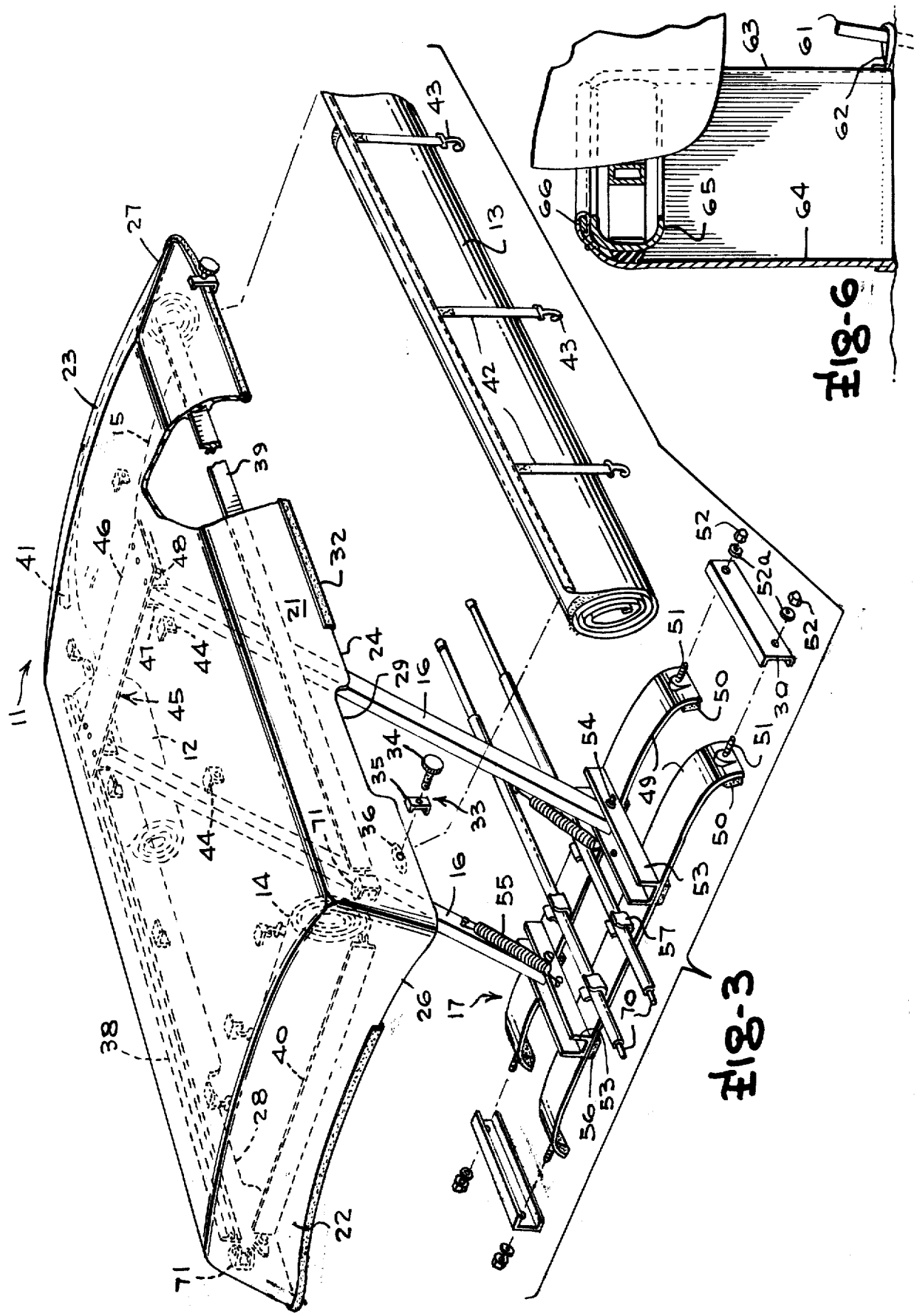

TENT SHELTER FOR AUTOMOTIVE VEHICLES AND THE LIKE

BACKGROUND AND OBJECTS OF THE INVENTION

The present invention relates in general to a tent shelter mounted on and used in combination with an automotive vehicle for camping or work, and more specifically to a selfcontained tent shelter unit which is carried on the roof of a vehicle such as a station wagon or utility van and is pivotable from a storage position overlying the vehicle roof to a rearwardly and upwardly displaced position to form a walled enclosure at the rear or side of the vehicle. This configuration permits direct access between the shelter enclosure and the vehicle to afford the occupants' privacy or access to equipment and to avoid exposure to inclement weather.

A primary object of the invention is to provide an improved tent structure for sleeping, cooking and recreation or work in conjunction with an automotive or maintenance vehicle which can be compactly stowed on the vehicle roof for convenient and inconspicuous transportation without intruding on the interior space of the vehicle.

Another object of this invention is to provide such a tent shelter which may be stowed on the roof of the vehicle all year without affecting operating performance, visual appearance or usability of the vehicle.

A further purpose of this invention is to provide a roof-top stowed tent or shelter which assembles quickly and easily adjacent to an automotive or maintenance vehicle to form a weatherproof enclosure providing direct entry into the vehicle.

These and other objects of the present invention will become apparent from the following detailed description, taken in conjunction with the accompanying drawings.

BRIEF DESCRIPTION OF THE FIGURES

FIG. 2 is a side perspective view of the tent shelter in the erected position relative to the associated station wagon;

FIG. 3 is an exploded perspective view of the movable shelter roof structure and the linkage and mounting assembly of the tent shelter;

FIG. 6 is a fragmentary sectional view through the tent shelter adjacent the rear station wagon bumper, showing a preferred embodiment for attaching the tent wall curtain sections together and to the rear bumper.

DETAILED DESCRIPTION OF A PREFERRED EMBODIMENT

Figure 1:
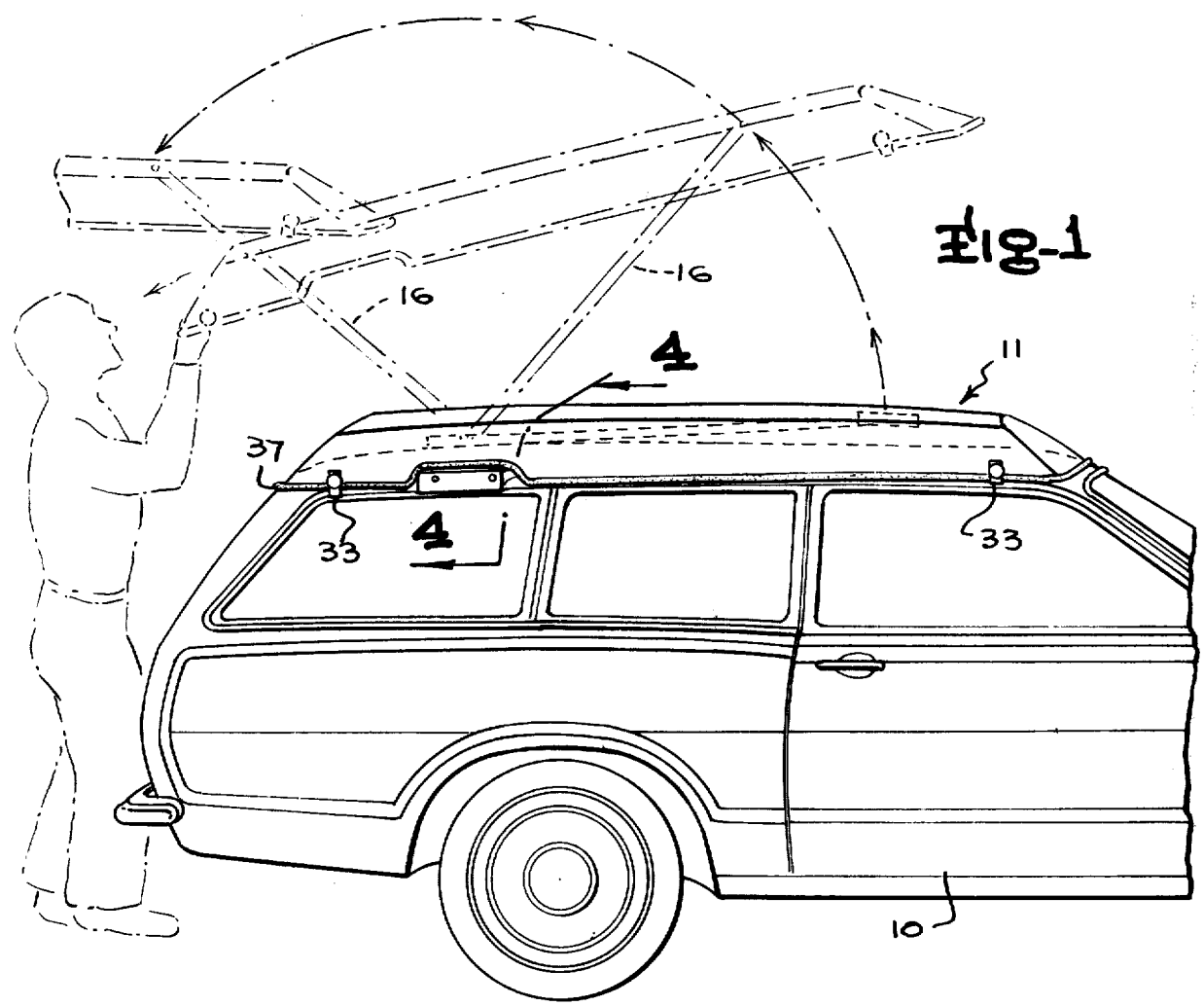
FIG. 1 is a perspective view of a preferred embodiment of the invention, showing in solid lines the tent shelter installed in normal stowage position on a station wagon and illustrating in broken lines the erected position and a transitional position between the two.

Referring to the drawings, there is illustrated a preferred embodiment of the tent shelter unit assembled with a station wagon vehicle 10 and generally comprising a shelter roof 11 forming a downwardly opening housing enclosure for the remaining tent components including roll down side and end curtains 12, 13, 14 and 15 which form the tent walls shown in FIG. 2; pivoting links 16 which permit the shelter roof to assume the positions shown in FIG. 1 and FIG. 2; releasible mounting bars 17 which are clamped to the vehicle roof and provides the lower pivots for the links 16; and poles 18 shown in FIG. 2 which support the false roof at the end most remote to the vehicle.

The shelter roof 11 is fabricated of a material such as plastic, molded fiberglass or metal and has a relatively flat top portion 19 which is similar in contour to the roof of the station wagon with downwardly projecting integral side portions 20 and 21, rear side portion 22 and front side portion 23. The four side portions of the shelter roof 11 are contoured along their lower edges 24, 25, 26 and 27 to match the contour of the roof to provide a tight fit against the vehicle roof to keep out foreign matter and have notches 28 and 29 shown in FIG. 3 to accommodate the clamp formations at the ends of the mounting bar 17 and the clamping channels 30. The lower edges of the sides are covered with a resilient cushioning strip 32 which prevents the lower edges from scratching the paint on the roof of the vehicle.

Figure 4:
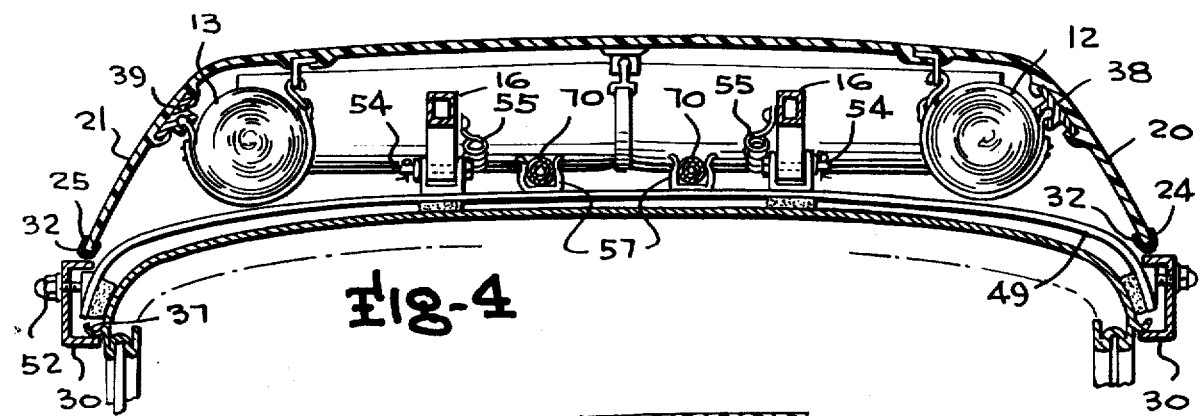
FIG. 4 is a sectional view of the tent shelter and station wagon roof taken along line 4—4 in FIG. 1, showing the tent shelter in the stowed position.
Figure 5:
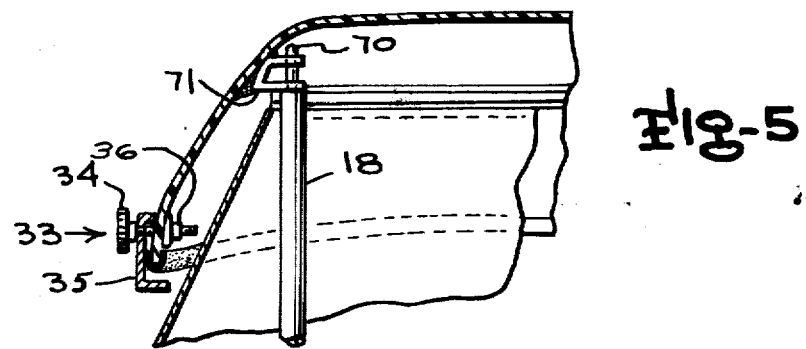
FIG. 5 is a fragmentary sectional view of the rear corner portion of the shelter roof in the erect position showing portions of the side curtains and support poles, taken along line 5—5 in FIG. 2.

When the shelter roof 11 is stowed on the vehicle roof as shown in FIGS. 1 and 4, it is restrained in the stowed position by clamp assembly 33 shown particularly in FIGS. 3 and 5, comprising a bolt 34, clamping channel 35 and a captive nut 36 which lock the shelter roof on the roof of the vehicle by clamping over the standard vehicle drip trough 37.

Elongated mounting strips 38, 39, 40 and 41 attached to the inner surface of the shelter roof side portions retain the enlarged upper edges of the side curtains 12 and 13, rear curtain 14 and front curtain 15, as shown in FIG. 4, which form the walls of the tent, and are stored in the rolled up condition as seen in FIGS. 3 and 4. Each curtain has three binder straps 42 attached near the top edge of the curtain and each strap has a hook 43 which is inserted through clip 44 attached to the inner surface of the shelter roof to retain the curtains in the rolled up position.

The linkage upper pivot bracket 45 has a mounting plate 46 attached to the inner surface of the top near the front of the shelter roof and has a pair of channels or two pairs of vertical depending plates 47 attached near each end to the mounting plate. Pins 48 extend through the plates 47 and the upper ends of the links 16 to provide pivot connections between the shelter roof and the links.

The releasible mounting bars 17 have two concavely curved end formations 49 having resilient pads 50 thereon to bear against the roof of the vehicle without scratching the roof surface and integral studs 51 for receiving nuts 52 and washers 52a to retain channel clamp 30 over the drip trough 37, as shown in FIG. 4. Channel members 53 are rigidly attached to the mounting bars 17 and retain pins 54 which provide the lower pivots for the pivoting links 16. Springs 55 attached th links 16 and channel members 53 assist the operator in pivoting the tent roof and links to the tent shelter position indicated in FIG. 1. Resilient pads 56 prevent the bars 17 from scratching the surface of the vehicle roof. Spring clips 57 provide resilient stowing clamps for the support poles 18 under the shelter roof when the poles are not in use.

Side curtain 13 has a flexible screen opening 58 with flexible reinforcing frame 59 to provide ventilation and light for the tent. Access to the tent and thereby to the rear of the vehicle is provided by zippered or "Velcro" opening 60 in the rear tent wall which extends from the ground to the shelter roof. The curtains are staked down at ground level by stakes 61 which are driven into the ground through loops 62 located in the corners as shown in FIG. 2. The curtains are seamed and folded at the corners or joined at the corners of the respective walls by "Velco" fasteners 63 shown in FIG. 2 and FIG. 6. The lower portion 64 of the front curtain 20 is attached to the vehicle bumper 65 by magnets 66 or by metal clips similar to the subsequently described metal clips 68 which are sewed into or onto the seams as seen in FIG. 6. The portions of the front curtain 15 designed to be located immediately adjacent the vehicle are contoured to fit the vehicle and are attached to the upper vehicle body by the straps 67 having metal clips 68 to catch on the edge of the vehicle window frames 69 which aid in anchoring the front portions of the tent to the vehicle. Since the curtains are contoured to fit the vehicle and are held tightly against it, the weather and insects are effectively excluded from the interior of the tent and vehicle.

Support poles 18 telescope to permit easy storing under the tent roof and have a pole pin 70 extending from the upper end of the polle to be inserted through the holes in pole bracket 71, as seen in FIG. 5, to retain the upper end of the pole while the lower end of the pole rests on the ground as seen in FIG. 2.

To erect the tent shelter the operator unscrews the bolts 34 on the clamp assembly 33 to release the shelter roof from the vehicle roof. Then, as seen in FIG. 1, the operator pivots the shelter roof 11 and links 16 up and over until the shelter roof is in the extended position shown in FIGS. 1 and 2. Poles 18 are removed from the spring clips 57 and installed as seen in FIG. 2 by inserting the pole pins 70 in pole brackets 71 and then telescopically extending the poles until they rest on the ground. The hooks 43 are released thereby permitting the curtains 12, 13, 14 and 15 to unroll.

Hooks 68 are coupled onto the window frames 69 and stakes 61 are driven into the ground through loops 62. The magnets 66 are positioned on the bumper and the "Velco" fasteners on the edges of the curtains are joined.

By opening the rear door or tailgate to the station wagon, the tent interior is accessible from the vehicle and vice versa without becoming exposed to the weather. To stow the tent camper unit, the operation is simply reversed.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the dependent claims.

I claim:

1. A tent camper in combination with a vehicle having a roof and comprising:
    a rigid shelter roof adapted to be stored immediately above and against the roof of the vehicle and having a generally horizontal top contoured like the vehicle roof, longitudinally downwardly extending side walls with lower edges contoured to fit tightly against the vehicle roof, and transversely downwardly extending front and rear walls with lower edges contoured to also fit tightly against the vehicle roof;
    a mounting bar assembly adapted to be releasably mounted on the roof of the vehicle near the rear thereof;
    a pair of parallel rigid links of equal length pivotally attached at an upper end to a forward portion of the shelter roof top and pivotally attached at a lower end to the removable mounting bar whereby the shelter roof may be raised above and extended rearwardly of the rear edge of the vehicle roof along an arcuate path by pivoting the links to the desired extended position;
    four wall curtains respectively attached to each of the side walls, the front wall, and rear wall of the tent roof adapted to be rolled up and stored under the shelter roof when the latter is stored under the shelter roof when the latter is stored on the vehicle roof and adapted to be rolled down when the shelter roof is in an extended position to form the tent enclosure with the vehicle as a portion of one wall and the ground adjacent the rear of the vehicle as a floor of the tent enclosures;
    securing straps attached near the upper edge of each curtain and adpated to hold the curtains in the rolled up position;
    ground tie down loops on the lower edge of each curtain for staking the lower edge of the curtains against the ground;
    a separable fastener in the rear curtain extending from the tent roof to the lower edge of the rear curtain to provide access to the tent camper and thereby the rear of vehicle;
    separable fasteners on the curtains along vertical edges thereof to permit joining the curtains with the separable fasteners to form the tent enclosure;
    a pair of pole brackets attached to the rear of the inner surface of the shelter roof top; and
    a pair of telescoping ground engaging poles adapted to be secured to the pole brackets to provide support for the tent roof; and
    the front curtain has an upper portion with a lower edge contoured to fit the roof of the vehicle, said contoured lower edge having straps attached thereto for attachment to the vehicle and the lower portion of the front curtain being contoured to fit the bumper of the vehicle and having attachment means to permit a sealing engagement between said bumper and said lower portion of the front curtain.

2. The tent camper of claim 1 wherein each wall curtain is attached inwardly of and to its respective side of the shelter roof.

3. The tent camper of claim 1 wherein the vehicle roof has a drip trough and the removable mounting bar includes means for removably clamping the bar to the drip trough.

4. The tent camper of claim 1 additionally comprising:
    a flexible screened window in each of the side curtains;
    a spring attached at one end to an intermediate portion of the rigid link and at the other end to the mounting bar to assist in pivoting the shelter roof from the vehicle roof; and clip means on the mounting bar for retaining the ground engaging poles under the shelter roof when the shelter roof is stowed on the vehicle roof.

5. A tent camper in combination with a vehicle having a roof and comprising:

a rigid shelter roof adapted to be stored immediately above and against the roof of the vehicle and having a generally horizontal top contoured like the vehicle roof, longitudinally downwardly extending side walls with lower edges contoured to fit tightly against the vehicle roof, and transversely downwardly extending front and rear walls with lower edges contoured to also fit tightly against the vehicle roof;

a mounting bar assembly adapted to be releasably mounted on the roof of the vehicle near the rear thereof;

a pair of parallel rigid links of equal length pivotally attached at an upper end to a forward portion of the shelter roof top and pivotally attached at a lower end to the removable mounting bar whereby the shelter roof may be raised above and extended rearwardly of the rear edge of the vehicle roof along an arcuate path by pivoting the links to the desired extended position;

four wall curtains respectively attached to each of the side walls, the front wall, and rear wall of the shelter roof adapted to be rolled up and stored under the shelter roof when the latter is stored on the vehicle roof and adapted to be rolled down when the shelter roof is in an extended position to form a tent enclosure with the vehicle as a portion of one wall;

securing straps attached near the upper edge of each curtain and adapted to hold the curtains in the rolled up position;

ground tie down loops on the lower edge of each curtain for staking the lower edge of the curtains against the ground;

a separable fastener in the rear curtain extending from the shelter roof to the lower edge of the rear curtain to provide access to the tent enclosure and thereby the rear of the vehicle;

separable fasteners on the curtains along vertical edges thereof to permit joining the curtains with the separable fasteners to form the tent enclosure;

a pair of pole brackets attached to the rear of the inner surface of the shelter roof top;

a pair of telescoping ground engaging poles adapted to be secured to the pole brackets to provide support for the tent roof;

magnets in the lower portion of the front curtain to retain the edges of the lower portion against the bumper; and straps having hooks at the ends thereof attached to the upper portion of the front curtain adapted to engage the window frame of the vehicle.

6. A tent camper in combination with a vehicle having a roof and comprising:

a rigid shelter roof adapted to be stored immediately above the roof of the vehicle and having a generally horizontal top with longitudinally downwardly extending side walls and with tranversely downwardly extending front and rear walls having lower edges located close to the vehicle top in the stored position of the shelter roof;

a mounting bar assembly adapted to be releasably mounted on the roof of the vehicle near the rear thereof;

a pair of parallel rigid links of equal length pivotally attached at an upper end to a forward portion of the shelter roof top and pivotaily attached at a lower end to the removable mounting bar whereby the shelter roof may be raised above and extended rearwardly of the rear edge of the vehicle roof along an arcuate path by pivoting the links to the desired extended position;

four wall curtains respectively attached to each of the side walls, the front wall, and rear wall of the shelter roof adapted to be rolled up and stored under the shelter roof when the latter is stored on the vehicle roof and adapted to be rolled down when the shelter roof is in an extended position to form a tent enclosure with the vehicle as a portion of one wall;

securing straps attached near the upper edge of each curtain and adapted to hold the curtains in the rolled up position;

ground tie down loops on the lower edge of each curtain for staking the lower edge of the curtains against the ground;

a separable fastener in the rear curtain extending from the shelter roof to the lower edge of the rear curtain to provide access to the tent enclosure and thereby the rear of the vehicle;

separable fasteners on the curtains along vertical edges thereof to permit joining the curtains with the separable fasteners to form the tent enclosure;

a pair of pole brackets attached to the rear of the inner surface of the shelter roof top;

a pair of telescoping ground engaging poles adapted to be secured to the pole brackets to provide support for the tent roof;

magnets in the lower portion of the front curtain to retain the edges of the lower portion against the bumper; and straps having hooks at the ends thereof attached to the upper portion of the front curtain adapted to engage the window frames of the vehicle.

* * * * *